(12) United States Patent
Drewes

(10) Patent No.: US 7,887,073 B2
(45) Date of Patent: Feb. 15, 2011

(54) CAST MEMBER HAVING AN INTEGRATED STEEL SLEEVE

(75) Inventor: Olaf Drewes, Aschaffenburg (DE)

(73) Assignee: SAF-Holland GmbH, Bessenbach-Keilberg (DE)

( * ) Notice: Subject to any disclaimer, the term of this patent is extended or adjusted under 35 U.S.C. 154(b) by 187 days.

(21) Appl. No.: 12/280,182

(22) PCT Filed: Feb. 27, 2007

(86) PCT No.: PCT/EP2007/001687

§ 371 (c)(1),
(2), (4) Date: Aug. 21, 2008

(87) PCT Pub. No.: WO2007/098927

PCT Pub. Date: Sep. 7, 2007

(65) Prior Publication Data

US 2009/0058029 A1    Mar. 5, 2009

(30) Foreign Application Priority Data

Mar. 1, 2006    (DE) .................... 10 2006 009 441

(51) Int. Cl.
*B60G 3/12*    (2006.01)

(52) U.S. Cl. ................ 280/124.128; 280/124.116; 264/261; 264/271.1

(58) Field of Classification Search .......... 280/124.1, 280/124.116, 124.128, 124.157, 124.133; 264/261, 263, 271.1; 301/126, 124.1, 131
See application file for complete search history.

(56) References Cited

U.S. PATENT DOCUMENTS 5,366,237 A * 11/1994 Dilling et al. ......... 280/124.116
5,375,871 A * 12/1994 Mitchell et al. ....... 280/124.116
6,508,482 B2 * 1/2003 Pierce et al. .......... 280/124.116
6,827,360 B2 * 12/2004 Chan et al. ............ 280/124.116
7,007,960 B2 * 3/2006 Chalin et al. .......... 280/124.116
7,048,288 B2 * 5/2006 Chan et al. ............ 280/124.116
7,086,655 B2 * 8/2006 Chan et al. ............ 280/124.116
7,178,816 B2 * 2/2007 Chan et al. ............ 280/124.116
7,201,388 B2 * 4/2007 Abrat et al. ........... 280/124.128
7,360,774 B2 * 4/2008 Saieg et al. ........... 280/124.128
7,370,872 B2 * 5/2008 Abrat et al. ........... 280/124.116
2003/0067133 A1 * 4/2003 Eveley ................. 280/124.11
2005/0156462 A1    7/2005 Abrat et al.
2007/0262551 A1 * 11/2007 Hughes ............... 280/124.128

FOREIGN PATENT DOCUMENTS

| DE | 10060312 A1 | 1/2002 |
| EP | 0830959 A2 | 3/1998 |
| WO | 2004054825 A2 | 7/2004 |

* cited by examiner

*Primary Examiner*—Paul N Dickson
*Assistant Examiner*—Drew Brown

(57) ABSTRACT

The invention relates to as suspension unit for a vehicle, in particular a motor vehicle, having a rigid axle, comprising a longitudinal member or axle member having a suspension section, a support section and an axle receptacle section, wherein the suspension section is designed to be rotatably or pivotably articulatedly mounted on a frame element of the vehicle, the longitudinal member can be supported on the frame element by means of the support section, and the vehicle axle can be coupled to the axle receptacle section and to a hollow cylindrical element. The longitudinal member is formed from a cast or composite material and the hollow cylindrical element is formed from a weldable material. The hollow cylindrical element is arranged in the axle receptacle section and is connected to the longitudinal member in a form-fitting or force-fitting manner.

13 Claims, 4 Drawing Sheets

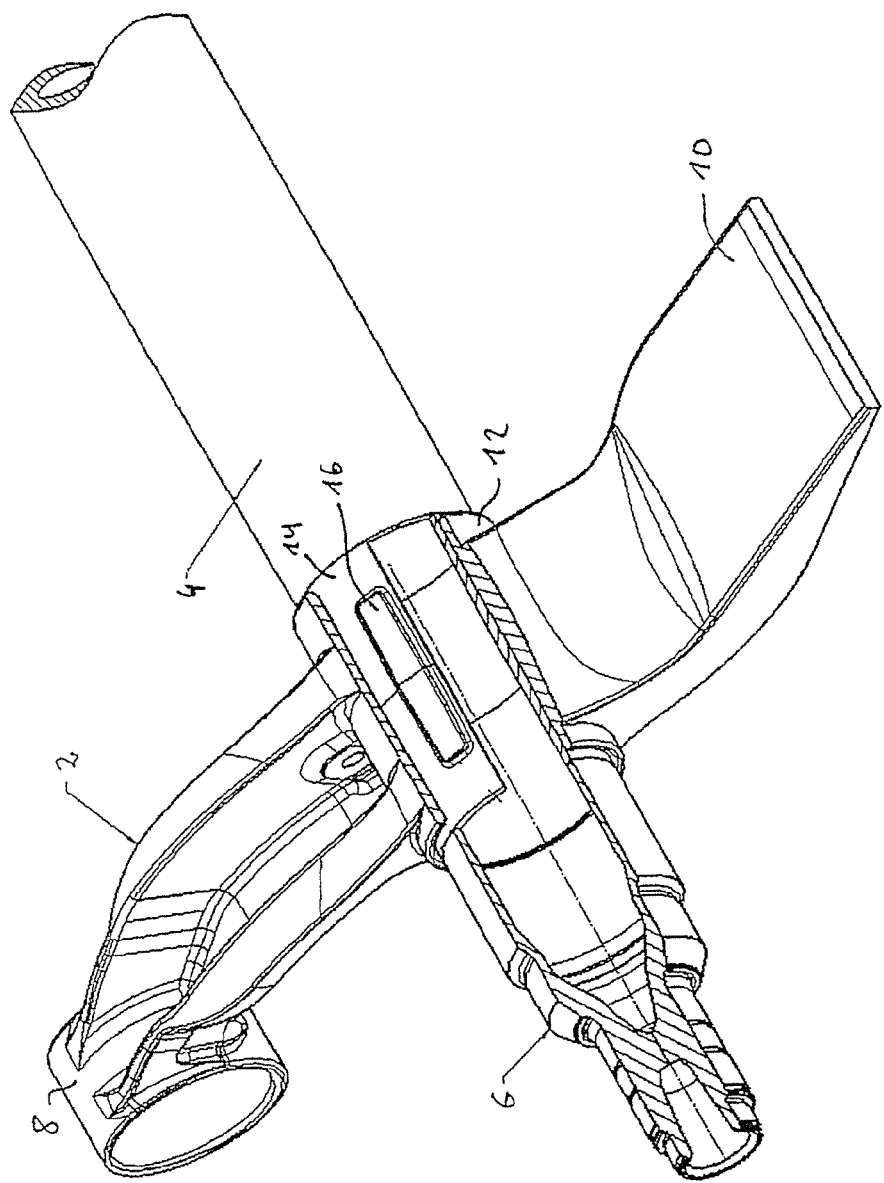

CAST MEMBER HAVING AN INTEGRATED STEEL SLEEVE

BACKGROUND OF THE INVENTION

The present invention pertains to a suspension unit for a vehicle, in particular, a motor vehicle, preferably with a rigid axle, as well as a method for making a suspension unit for a corresponding vehicle.

Suspension units for motor vehicles are rather familiar from the prior art. They are usually formed from a longitudinal member, which is arranged on a vehicle axle, joined at one end pivotably to a frame element of the vehicle and at the other end spring-mounted, in order to achieve a spring mounting of the vehicle axle. Usually the longitudinal member is clamped or screwed to the vehicle axle in this case, in order to achieve a force fitting between longitudinal member and vehicle axle. Another solution known from the prior art is to fabricate the longitudinal member and vehicle axle from weldable materials, such as steel, and to weld the longitudinal member and vehicle axle to each other.

The problem with the axle suspension units known from the prior art is that they are very costly to produce, they have high defect levels (prone to shrinkage cavities) on account of the generally complicated steel casting when the components are made from weldable material, and can only be subjected to limited mechanical loading (when using clamps or screws).

Thus, the problem of the present invention is to propose a suspension unit for a vehicle as well as a method of making a suspension unit for a vehicle, in particular, a motor vehicle with a rigid axle, by means of which an economical and dependable axle suspension unit is provided, able to withstand high forces and torques.

This problem is solved according to the invention by a suspension unit for a vehicle with the features of claim 1, as well as a method for making a suspension unit for a vehicle with the features of claim 10. Preferred embodiments are the subject of the subclaims.

SUMMARY OF THE INVENTION

According to the invention, a suspension unit is provided for a vehicle, in particular, a motor vehicle with a rigid axle, comprising a longitudinal member or axle member having a suspension section, a support section and an axle receptacle section, wherein the suspension section is designed to be rotatably or pivotably articulatedly mounted on a frame element of the vehicle, the longitudinal member can be supported on the frame element by means of the support section, and the vehicle axle can be arranged on or fastened to the axle receptacle section arranged between the suspension section and the support section, as well as a hollow cylindrical element, wherein the longitudinal member is formed from a cast or composite material and the hollow cylindrical element is formed from a weldable material, and wherein the hollow cylindrical element is arranged in the axle receptacle section and is connected to the longitudinal member in a form-fitting and/or force-fitting manner. In other words, the longitudinal member has an essentially oblong geometrical configuration, and preferably the suspension section and the support section are provided at its distal ends, with the axle receptacle section arranged between them. The axle receptacle section preferably has a recess or breakthrough or hole, in which the hollow cylindrical element is provided. The hollow cylindrical element is arranged in the axle receptacle section so that it is joined in form-fitting and/or force-fitting manner to the longitudinal member. In other words, the hollow cylindrical element is advisedly enclosed at least partly by the longitudinal member. This produces a connection between hollow cylindrical element and longitudinal member that can advantageously transmit high torques and forces. In the present invention, the term hollow cylindrical element should not be confined solely to hollow cylinders, but can include, besides tubular elements, also cylindrical bodies that are not hollow in configuration. Thus, the connection of longitudinal member made of cast or composite material and hollow cylindrical element made of weldable material produces a unit which can be welded onto additional elements via the hollow cylindrical element. Consequently, traditional welding methods can continue to be used to advantage for the fastening of additional axle components, so that costly and time-consuming methods such as pressure welding and welding without preheating can be avoided. Furthermore, the longitudinal member can be made from any desired materials, so that costly and shrinkage-prone cast steel does not have to be used. Moreover, the time-consuming machining of the intersection of the longitudinal member with the other axle components can be advantageously omitted, since they can be advantageously taken over by the hollow cylindrical element. Consequently, by the use of alternative materials for the longitudinal member, such as aluminum or composites, the suspension unit can be optimized in terms of weight and production technology.

Preferably, the longitudinal member is formed from a cast material and the hollow cylindrical element is joined to the longitudinal member especially by material closure. Preferably, the hollow cylindrical element in this case is cast in the axle receptacle section of the longitudinal member. Consequently, a suspension unit will be provided that can transmit very high forces and torques from the longitudinal member to the hollow cylindrical element or the vehicle axle.

Preferably, the hollow cylindrical element has at least in portions on its outer circumferential surface a profiling which enlarges the surface and/or a surface configuration provided with engaging sections, such as grooves, threads or knurling. In this way it is possible to provide an improved form-fitting and/or force-fitting between hollow cylindrical element and axle receptacle section. Consequently, the connection between hollow cylindrical element and axle receptacle section or longitudinal member is advantageously intimate, since at least the cast-in part of the hollow cylindrical element in the longitudinal member is provided at least in portions with grooves or similar surface-enlarging profiling and advisedly surrounded at the inner and outer surface by the casting material of the longitudinal member. This measure advantageously leads to a welding of the hollow cylindrical element to the material of the longitudinal member during the casting process. Thus, such a configuration can additionally provide a bonded connection.

In another preferred embodiment, the wall of the hollow cylindrical element is at least partly broken through at least in the region of the axle receptacle section. In other words, at least the part of the hollow cylindrical element being cast in can be broken through at least in portions, so that a welding and consequently a bonded connection between longitudinal member and hollow cylindrical element is further improved. Regardless of a welding, however, the material of the longitudinal member can flow at least partly into the depression or recess or breakthrough of the hollow cylindrical element, so that the form-fitting and/or force-fitting connection between longitudinal member and hollow cylindrical element is further optimized.

Preferably, the hollow cylindrical element has a round circular cross section. Of course, the hollow cylindrical element can also have any other desired cross sectional configuration, e.g., elliptical or angular or especially a polygonal shape.

Advantageously, the hollow cylindrical element projects on at least one side beyond the longitudinal member, in order to form corresponding welding sections for connection to the vehicle axle. Consequently, the hollow cylindrical element is not part of the vehicle axle, but serves to join the longitudinal member to the vehicle axle. Preferably, the hollow cylindrical element extends essentially perpendicular or at right angles to the lengthwise dimension of the longitudinal member, so that the hollow cylindrical element in the installed condition of the longitudinal member is arranged basically transverse to the direction of travel. The hollow cylindrical element can project beyond the longitudinal member at only one side thereof, but advantageously it sticks out on both broad sides of the longitudinal member, in order to assure an optimal tie-in with the vehicle axle. The hollow cylindrical element is advantageously shoved onto the vehicle axle or an element associated therewith (such as a stub axle) and welded to it in order to achieve a rigid or firm or undetachable tying to the vehicle axle. However, it is likewise possible to arrange the hollow cylindrical element adjoining the vehicle axle (or an element associated therewith), so that hollow cylindrical element and vehicle axle stand essentially "end to end". The hollow cylindrical element and vehicle axle are then welded together at their contact surfaces. However, any other forms of tying the hollow cylindrical element into the vehicle axle are also conceivable.

In another preferred embodiment, the hollow cylindrical element is fashioned as a vehicle axle or tubular axle segment or vehicle stub axle or wheel head segment or axle journal or wheel carrier. Consequently, vehicle axle and vehicle stub axle advantageously adjoin each other directly. Thus, no intervening longitudinal member is provided between vehicle axle and vehicle stub axle, so that a continuous connection can be assured between vehicle axle and stub axle, so that the loads are substantially reduced for the longitudinal member as compared to designs in which the stub axle, longitudinal member, and axle tube are arranged in a row with each other. Based on the direct connection between vehicle axle and vehicle stub axle, large torques and forces can be transmitted.

Furthermore, the invention specifies a method for the making of a suspension unit for a vehicle, in particular, a motor vehicle with a rigid axle, comprising the steps: providing of a hollow cylindrical element made from a weldable material, providing of a longitudinal member mold to fashion a longitudinal member therein, inserting the hollow cylindrical element into the longitudinal member mold, and molding the longitudinal member around the hollow cylindrical element in the longitudinal member mold, so that hollow cylindrical element and longitudinal member are joined in a form-fitting and/or force-fitting manner.

Advantageously, the step of molding the longitudinal member occurs by pouring into the longitudinal member mold, so that the hollow cylindrical element is joined to the longitudinal member, especially in a bonded manner.

Moreover, the method advantageously has the steps arranging the hollow cylindrical element on or against a vehicle axle or a vehicle stub axle, and welding the hollow cylindrical element to the vehicle axle or the vehicle stub axle.

As an alternative to this, the hollow cylindrical element can be provided in the form of a vehicle axle or a vehicle stub axle that is welded to the remaining vehicle axle or vehicle stub axle so that vehicle axle and vehicle stub axle preferably adjoin each other directly.

Of course, all the features and benefits of the invented suspension unit for a vehicle can also find application in the invented method for making a suspension unit for a vehicle.

Additional features and benefits of the invention will be described hereafter as an example, using the accompanying drawings of preferred embodiments.

BRIEF DESCRIPTION OF THE DRAWINGS

FIG. 4 is a partly sectioned perspective view of a fourth embodiment of the invented suspension unit.

DETAILED DESCRIPTION OF THE PREFERRED EMBODIMENTS

Figure 1:
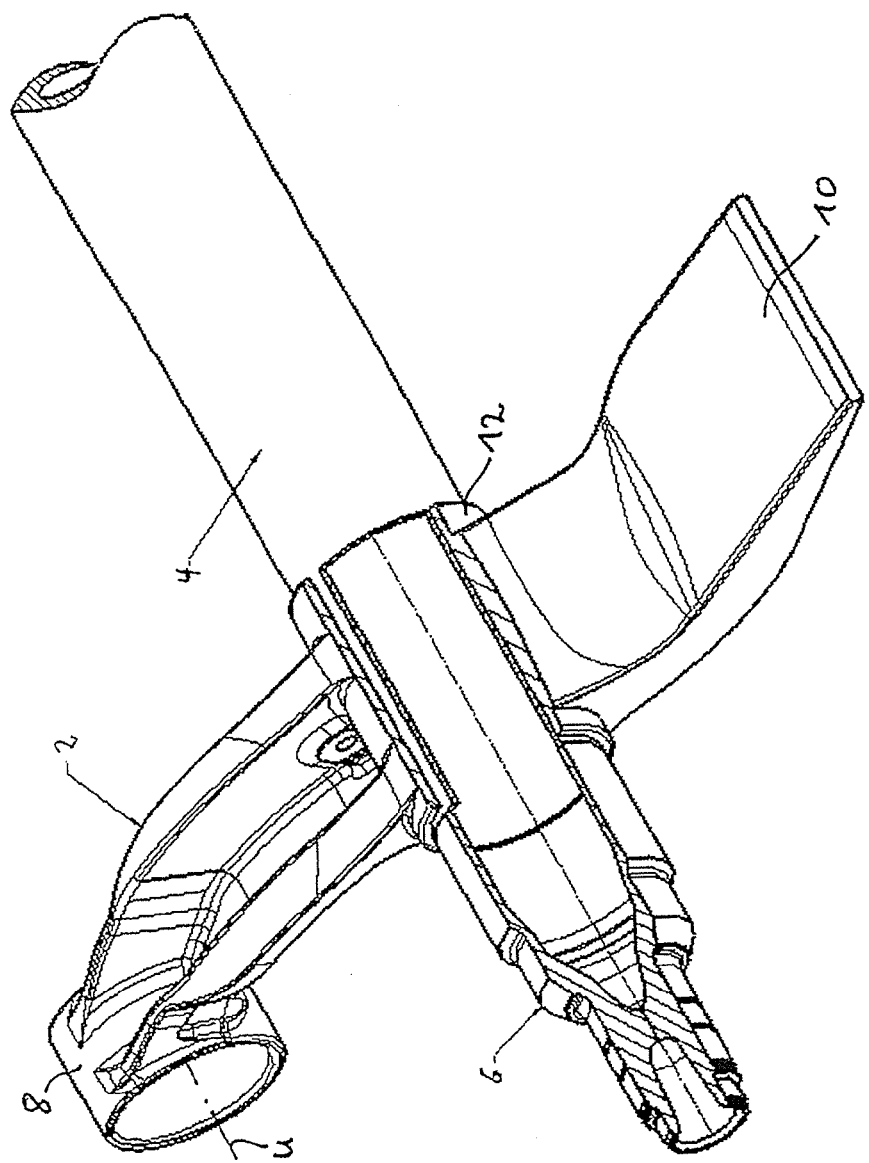
FIG. 1 is a partly sectioned perspective view of a first embodiment of the invented suspension unit.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows a partly sectioned perspective view of a first embodiment of the invented suspension unit for a vehicle, which is configured in particular as a motor vehicle with rigid axle. The suspension unit has a longitudinal member 2, which is arranged on a hollow cylindrical element. Adjoining the hollow cylindrical element 4, there extends a vehicle stub axle 6, on which the rim or tire (not shown) of the vehicle is arranged, directly or indirectly.

The longitudinal member 2 has a suspension section 8, which is designed to be linked to a frame element of a vehicle via a corresponding pivot axis U. In other words, the longitudinal member 2 can swivel about the pivot axis U. Moreover, the longitudinal member 2 has a support section 10, which is provided essentially at a distal end of the longitudinal member 2, opposite the suspension section 8. The longitudinal member 2 can be supported on the frame element of the vehicle by means of the support section 10, so as to limit the swiveling of the longitudinal member. Between suspension section 8 and support section 10, the longitudinal member 2 has an axle receptacle section 12. The axle receptacle section 12 is configured so that the vehicle axle 4 can extend through it. In the present embodiment, the hollow cylindrical element corresponds to a tubular axle segment or a vehicle axle member 4. The longitudinal member is made from a cast or composite material, preferably being cast from a metal. The hollow cylindrical element or vehicle axle 4, on the other hand, is advantageously fashioned from a weldable material, so that other parts of the vehicle axle can be welded to it, such as the vehicle stub axle 6. Consequently, the hollow cylindrical element is arranged in the axle receptacle section 12 so that it is joined to the longitudinal member in form-fitting and/or force-fitting manner.

Advantageously, the suspension unit is produced by inserting the hollow cylindrical element or the vehicle axle 4 into a longitudinal member mold and casting the longitudinal member 2 about the hollow cylindrical element. Consequently, in addition to a form-fitting and/or force-fitting, a material bonding advantageously results, since the longitudinal member material and the material of the hollow cylindrical element advantageously flow into each other, at least in some areas, during the casting process. The material bonding can preferably be strengthened, in particular, when the hollow cylindrical element has a profiling at least in certain areas of its outer circumferential surface, especially one which enlarges the surface, and/or has a surface configuration provided with engaging segments, such as grooves, threading or knurling. This measure has the advantageous effect, when the material of the longitudinal member is being poured in around the hollow cylindrical element, of a welding, at least in certain areas, of the weldable material of the hollow cylindrical element (such as steel) to the material of the longitudinal member 2 (such as gray cast iron). In this way, a stable connection is created between the longitudinal member 2 and hollow cylindrical element or vehicle axle 4, without having to provide for costly and time-consuming pressure welding or welding without preheating, or having to fabricate the longitudinal member 2 from a steel casting that has a high tendency to casting defects.

Figure 2:
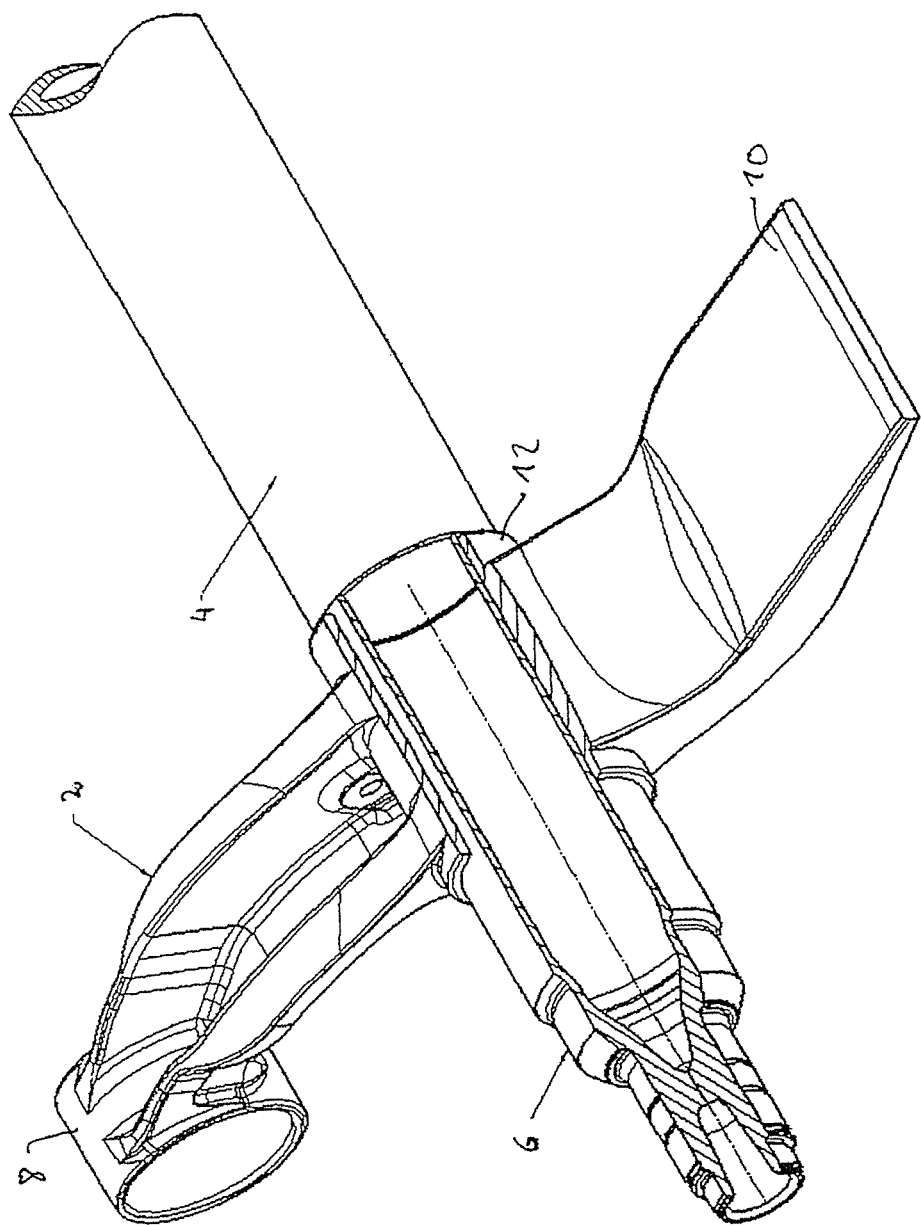
FIG. 2 is a partly sectioned perspective view of a second embodiment of the invented suspension unit.

FIG. 2 shows a partly sectioned perspective view of a second embodiment of the invented suspension unit, where the elements identical with the first embodiment are provided with the same reference numbers and shall not be otherwise described. In contrast with the first embodiment shown in FIG. 1, the longitudinal member 2 is not arranged on the axle tube, but rather on a hollow cylindrical element, which is defined by the vehicle stub axle 6. As can be seen, the term hollow cylindrical element is not to be understood as necessarily defining a hollow body, but rather it can also be solid in configuration. The arrangement of the longitudinal member 2 on the vehicle stub axle 6 occurs in keeping with the embodiment shown in FIG. 1.

Figure 3:
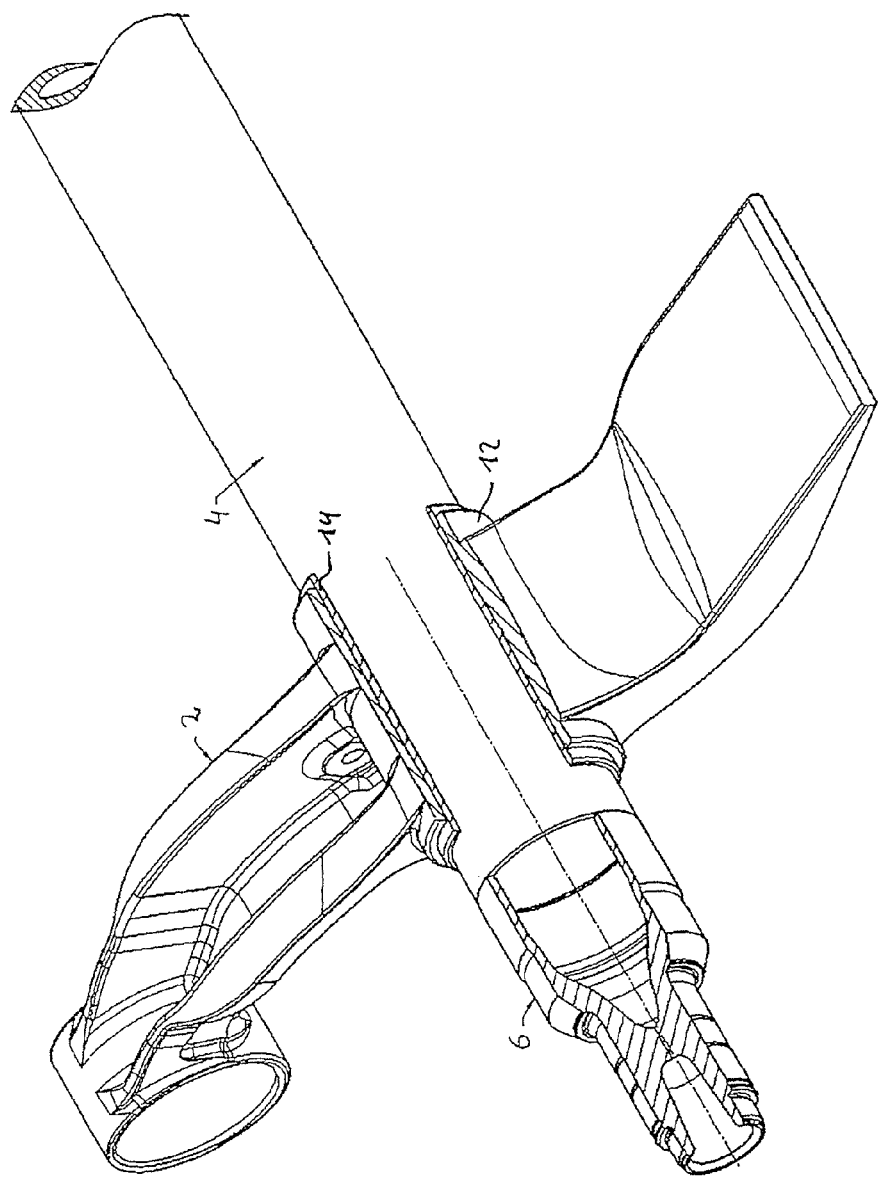
FIG. 3 is a partly sectioned perspective view of a third embodiment of the invented suspension unit.

FIG. 3 shows a partly sectioned perspective view of a third embodiment of the invented suspension unit, where the elements identical with the first embodiment and second embodiment are provided with the same reference numbers and shall not be otherwise described. In this embodiment, the longitudinal member 2 is arranged on a tubular hollow cylindrical element or tubular element 14 or placed in a connection with the latter, while the tubular element 14 is not configured as a proper part of the vehicle axle. Instead, the hollow cylindrical element or tubular element 14 constitutes an intermediate element between longitudinal member 2 and vehicle axle, which can be welded to the axle tube 4 or vehicle stub axle 6 by corresponding weld seams. For this, the tubular element 14 is advantageously fashioned so that at least on one side—preferably on both broad sides as shown in FIG. 3—it projects beyond the longitudinal member 2.

FIG. 4 shows a partly sectioned perspective view of a fourth embodiment of the invented suspension unit, where the elements identical with the first, second or third embodiment are provided with the same reference numbers and shall not be otherwise described. In this embodiment, the longitudinal member 2 is arranged on the tubular element 14 in accordance with the third embodiment or fastened to it or cast in it. However, in order to increase the stability of the connection between longitudinal member 2 and tubular element 14, at least one projection 16 is fashioned in the tubular element 14, which is enclosed or invested by the material of the longitudinal member 2. This further enhances the torque strength between longitudinal member 2 and tubular element 14, since the projection 16 acts as a barrier to a twisting movement between longitudinal member 2 and tubular element 14. In contrast with the above described embodiments, the hollow cylindrical element does not reach around the axle tube 4 or the vehicle stub axle 6, nor is it welded to the latter. Instead, the hollow cylindrical element or tubular element 14 is arranged between axle tube 4 and vehicle stub axle 6, so that axle tube 4, tubular element 14 and vehicle stub axle 6 adjoin each other in the axial direction. The connection between tubular element 14 and axle tube 4 or vehicle stub axle 6 can be made advantageously by a friction welding method.

Thus, the suspension unit of the invention ensures the transmission of a substantially higher load (torque and forces), while traditional welding methods can still be used, and no costly or shrinkage-prone steel casting needs to be used for the longitudinal member 2. Neither is a time-consuming machining of the intersections with the other axle components needed.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A suspension unit for a vehicle having a rigid axle, comprising:
   a longitudinal member having a suspension section, a support section and a receptacle section, wherein the suspension section is adapted to be rotatably mounted on a frame element of the vehicle, the longitudinal member adapted to be operably coupled to a frame element by the support section, and wherein the longitudinal member comprises at least a select one of a cast material and a composite material;
   an axle member generally coupled to the receptacle section; and
   a cylindrical element operably coupled with the axle member, wherein the cylindrical element comprises a weldable material, and wherein the cylindrical element is at least partially cast within the receptacle section of the longitudinal member.

2. The suspension of claim 1, wherein the cylindrical element includes an outer surface facing the axle member having at least a select one of grooves, threads, a projection, knurling, and differing outer circumferential dimensions.

3. The suspension of claim 1, wherein the cylindrical element includes a wall having an aperture extending therethrough proximate a region of the receptacle section.

4. The suspension unit of claim 1, wherein the cylindrical element has a round circular cross section.

5. The suspension unit of claim 1, wherein the cylindrical element projects beyond a side of the longitudinal member on at least one side of the longitudinal member, thereby forming welding sections for connection to at least a select one of the axle member and a vehicle stub axle.

6. The suspension unit of claim 1, wherein the cylindrical member is hollow.

7. The suspension unit of claim 1, wherein the cylindrical member receives the axle member.

8. The suspension unit of claim 1, wherein the cylindrical element is integrally coupled with the axle member.

9. Method for making a suspension unit for a vehicle having a rigid axle, comprising the steps:
   providing a cylindrical element comprising a weldable material;

providing a longitudinal member mold to fashion a longitudinal member therein;

inserting the cylindrical element into the longitudinal member mold; and molding the longitudinal member to include a suspension section adapted to be rotatably coupled with a frame element of a vehicle, and a receptacle section at least partially around the cylindrical element in the longitudinal member mold, such that the cylindrical element and longitudinal member are joined in at least a select one of a form-fitting, a force-fitting manner, and a bonded manner; and operably coupling the cylindrical element to an axle member.

10. The method of claim 9, wherein the step of providing the cylindrical element including providing the cylindrical element as a hollow element.

11. The method of claim 9, further comprising:

arranging the cylindrical element such that the cylindrical element abuts at least a select one of a vehicle axle and a vehicle stub axle; and welding the cylindrical element to at least a select one of the vehicle axle and the vehicle stub axle.

12. The method of claim 11, wherein the step of providing the cylindrical element includes providing the cylindrical element as a hollow element that receives at least a select one of the vehicle axle and the vehicle stub axle therein.

13. The method of claim 9, wherein the step of providing the cylindrical element includes providing the cylindrical element as the cylindrical element comprising a select one of a vehicle axle and a vehicle stub axle that is welded to the remaining select one of the vehicle axle and the vehicle stub axle, such that the vehicle axle and the vehicle stub axle abut one another.

* * * * *

UNITED STATES PATENT AND TRADEMARK OFFICE
CERTIFICATE OF CORRECTION

| | | |
|---|---|---|
| PATENT NO. | : 7,887,073 B2 | Page 1 of 1 |
| APPLICATION NO. | : 12/280182 | |
| DATED | : February 15, 2011 | |
| INVENTOR(S) | : Olaf Drewes | |

It is certified that error appears in the above-identified patent and that said Letters Patent is hereby corrected as shown below:

On the Title Pg, Item (57), Abstract:
Line 1, "to as suspension" should be --to a suspension--.

Column 1
Lines 34-38, Delete entire paragraph.

Signed and Sealed this
Tenth Day of May, 2011

David J. Kappos
*Director of the United States Patent and Trademark Office*